March 3, 1964     J. C. WISE     3,123,323
AUXILIARY POWER UNIT
Filed Oct. 10, 1960
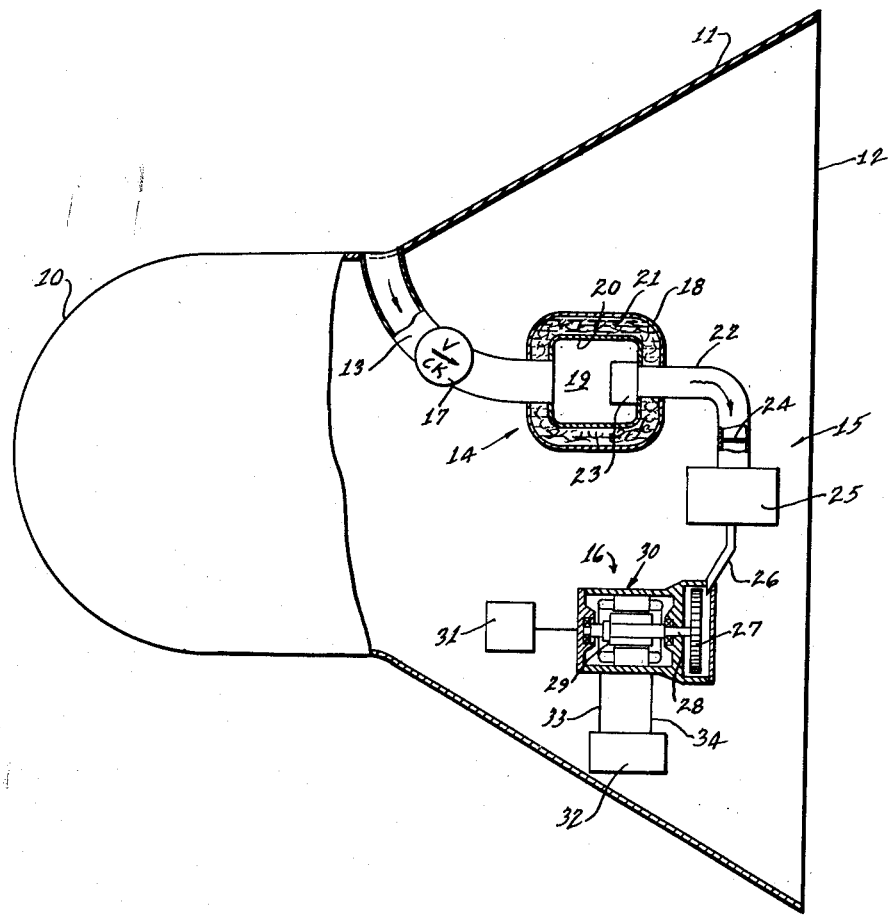
INVENTOR.
James C. Wise
BY
ATTORNEYS

United States Patent Office 3,123,323
Patented Mar. 3, 1964

3,123,323
AUXILIARY POWER UNIT
James C. Wise, Pepper Pike Village, Ohio, assignor to Thompson Ramo Wooldridge Inc., Cleveland, Ohio, a corporation of Ohio
Filed Oct. 10, 1960, Ser. No. 61,552
4 Claims. (Cl. 244—58)

This invention relates to a power unit and, more particularly, to an auxiliary power unit that is adapted to be installed in a space re-entry vehicle.

The nose cone or other portion of a guided or ballistic missile that re-enters the earth's atmosphere at the completion of a flight frequently requires a source of power to service the equipment mounted in it. Such a power source must be able to withstand the high pressures and temperatures encountered during the re-entry portion of the flight, and it is highly desirable that this power source be able to utilize these temperatures and pressures in the generation of a form of power that is usable by present day equipment.

Accordingly, it is a primary object of this invention to provide an auxiliary power unit for a space re-entry vehicle.

It is another primary object of this invention to provide an auxiliary power unit that is able to withstand relatively high temperatures and pressures.

It is still another primary object of this invention to provide an auxiliary power unit for a re-entry vehicle that is able to utilize the high temperatures and pressures encountered during the space re-entry portion of the vehicle's flight.

Other objects, features and advantages of the present invention will be more apparent from the following detailed description taken in conjunction with the accompanying single figure of the drawing which is a schematic illustration of a re-entry vehicle having an auxiliary power unit constructed in accordance with the invention.

With reference to the drawing, there is illustrated a conventional nose cone that includes a front end 10, a skirt 11, and a base 12 that is adapted to be releasably attached to a guided or ballistic missile. Mounted within this nose cone is an auxiliary power unit that includes an input duct 13, means 14 for generating a high temperature vapor, means 15 for regulating this vapor, and means 16 for converting this high temperature vapor into another form of energy.

During the re-entry portion of the vehicle's flight the air temperature and pressure on the surface of the nose cone rise to a very high level. This air is initially prevented from flowing through the input duct 13 to the vapor generating means 14 by a one-way check valve 17 that is positioned in the duct 13 at the entrance to the means 14. A preferred type of valve for this purpose is a pressure differential actuated valve having unequal areas in order to balance the forces on its two sides. This valve may be set to open when the pressure differential reaches a predetermined point and allow the hot air from the exterior of the nose cone to enter the means 14, or an additional mechanism (not shown) can be connected to open the valve 17 in response to a predetermined pressure, temperature, altitude, etc.

A means 14 for generating the high temperature vapor includes a container 18 that forms a chamber 19. A fluid that is capable of being transformed into a high temperature vapor on the introduction of the heated boundary layer air from the duct 13 is positioned in the chamber 19 prior to the flight of the vehicle. One means of accomplishing this is to fasten a liner 20 inside of the container 18 and fill the space between the liner 20 and the container 18 with a water absorbing material 21. This material 21 may be a commercially available sponge-like substance that is capable of absorbing and storing large quantities of water and is provided so that the water will be distributed evenly around the exterior of the chamber 19. To prevent this water from evaporating during storage, the liner 20 is made air-tight and sealed in the container 18 so that this water is trapped. The liner 20 is preferably made of a low melting temperature alloy or non-metallic material that will vaporize upon the introduction of the heated air from the duct 13. This is desirable so that large particles of the liner will not pass downstream out of the container 18 and clog the energy converting equipment or condense and cause clogging.

An output duct 22 is also connected to the container 18 and has a filter 23 attached to its inlet opening. A burst disc or diaphragm 24 and a pressure regulator 25 are also connected to the duct 22 downstream of the container 18 to prevent operation of the energy converting mechanism 16 before sufficient energy is available to complete the systems operation. The disc 24 is designed in a conventional manner to blow out at a predetermined pressure and the regulator 25 is a conventioned throttling pressure regulator that is designed to withstand the high temperatures encountered during such an operation.

One type of energy converting means 16 is a conventional turbo electric generator that includes a nozzle 26 that is connected to the output from the pressure regulator 25 and feeds the vapor to a turbine wheel 27. The wheel 27 has its drive shaft 28 connected to the rotor 29 of an alternator 30. A conventional control system 31 is connected to control the power output of the system and an electrical load 32 is connected to the output terminals of the alternator by two conductors 33 and 34.

As previously stated, as the vehicle re-enters the earth's atmosphere the temperature on the surface of the vehicle becomes extremely high and the stagnation boundary layer air pressure in the vicinity of the bleed inlet opening to the duct 13 becomes very high. At a predetermined point the one-way check valve 17 opens and the chamber 19 is charged with this high temperature air in a very short period of time. This high temperature air vaporizes the liner 20 and flashes the water in the absorbing material 21 into steam. When the steam pressure in the chamber 19 reaches a predetermined point the disc 24 blows out and the steam flow through the duct 22 and the pressure regulator 25 which maintains the steam pressure at a relatively constant value. The steam then flows through the nozzle 26 to the turbine and the electrical energy generated by the alternator 30 is fed to the load 32. Due to the small amount of air required and the very high stagnation pressure available during re-entry, the amount of time required to charge the plenum chamber 19 is extremely short.

It will be apparent that modifications and variations may be effected without departing from the scope of the novel concepts of the present invention. For example, instead of feeding the high temperature vapor from the nozzle 26 to a turbine it can be fed directly to a load, or the drive shaft 28 of the turbine wheel could be connected directly to a rotary load. Suitable loads for such a system could be means for arming and fusing a war head, telemetry gear, means for charging batteries, etc. The control system 31 is conventional and could be electrical, mechanical, pneumatic, hydraulic, etc. The absorbing material 21 in the container 18 could be dispensed with so that the fluid could be free to circulate in the space between the container 18 and the liner 20. Various types of fluids can be used, the only requirement being that they be vaporizable within the range of the temperatures encountered during the re-entry portion of the vehicle's flight. Further, it is not necessary that the fluid be a liquid since it is conceivable that a gas could be sealed under pressure in the space between the container 18 and the liner 20 and caused to expand upon the introduction of the heated air into the chamber 19.

I claim as my invention:

1. An auxiliary power unit for a re-entry vehicle comprising:
  a bleed opening defined by said re-entry vehicle to bleed hot exterior boundary layer air,
  means defining a chamber mounted within the re-entry vehicle,
  a duct connecting the chamber with the bleed opening to conduct hot boundary layer air into said chamber,
  a fluid stored in said chamber and mixing with the hot boundary air, and
  an outlet opening connected to said chamber leading to an energy utilizing load.

2. An auxiliary power unit for a re-entry vehicle comprising:
  a bleed opening defined by said re-entry vehicle to bleed hot exterior boundary layer air,
  said bleed opening being positioned at a point along the exterior of the re-entry vehicle where the stagnation air pressure is high,
  means defining a chamber mounted within the re-entry vehicle,
  a duct connecting the chamber with the bleed opening to conduct hot boundary layer air into said chamber,
  a fluid stored in said chamber and mixing with the hot boundary air, and
  an outlet opening connected to said chamber leading to an energy utilizing load.

3. An auxiliary power unit for a re-entry vehicle comprising:
  a bleed opening defined by said re-entry vehicle to bleed hot exterior boundary layer air,
  means defining a chamber mounted within the re-entry vehicle,
  a partition in said chamber dividing the chamber into first and second portions,
  an absorbing material disposed in said first portion,
  said absorbing material absorbing and storing a hot boundary layer air vaporizable fluid,
  an inlet duct connecting the chamber with the bleed opening to conduct hot boundary layer air into said chamber second portion,
  means to mix the hot boundary layer air with the vaporizable fluid to vaporize said fluid,
  an outlet conduit connected to said chamber second portion to conduct the mixture of vaporized fluid and hot boundary layer air to an energy utilizing load, and
  means in said outlet conduit for regulating the flow of said mixture therethrough.

4. An auxiliary power unit for a re-entry vehicle comprising:
  a bleed opening defined by said re-entry vehicle to bleed hot exterior boundary layer air,
  means defining a chamber mounted within the re-entry vehicle,
  a hot boundary air vaporizable liner in said chamber dividing the chamber into first and second portions,
  an absorbing material disposed in said first portion,
  said absorbing material absorbing and storing a hot boundary layer air vaporizable fluid,
  an inlet duct connecting the chamber with the bleed opening to conduct hot boundary layer air into said chamber second portion to vaporize the vaporizable liner and mix the hot boundary layer air with the vaporizable fluid to vaporize said fluid,
  a one-way check valve positioned in said inlet duct,
  an outlet conduit connected to said chamber second portion to conduct the mixture of vaporized fluid and hot boundary layer air to an energy utilizing load, and
  means in said outlet conduit for regulating the flow of said mixture therethrough.

References Cited in the file of this patent

UNITED STATES PATENTS

| | | |
|---|---|---|
| 2,374,607 | McCollum | Apr. 24, 1945 |
| 2,937,597 | Winn | May 24, 1960 |
| 2,958,482 | Summers | Nov. 1, 1960 |

OTHER REFERENCES

Aviation Week, October 12, 1959, page 59.